(12) United States Patent
Klawin et al.

(10) Patent No.: US 12,540,677 B2
(45) Date of Patent: Feb. 3, 2026

(54) VALVE CARTRIDGE

(71) Applicant: FLÜHS DREHTECHNIK GMBH, Lüdenscheid (DE)

(72) Inventors: Tim-Florian Klawin, Halver (DE); Lutz Lange, Luedenscheid (DE)

(73) Assignee: FLÜHS DREHTECHNIK GMBH, Lüdenscheid (DE)

( * ) Notice: Subject to any disclaimer, the term of this patent is extended or adjusted under 35 U.S.C. 154(b) by 62 days.

(21) Appl. No.: 18/292,440

(22) PCT Filed: Aug. 10, 2022

(86) PCT No.: PCT/EP2022/072455
§ 371 (c)(1),
(2) Date: Jan. 26, 2024

(87) PCT Pub. No.: WO2023/020913
PCT Pub. Date: Feb. 23, 2023

(65) Prior Publication Data
US 2025/0075802 A1 Mar. 6, 2025

(30) Foreign Application Priority Data
Aug. 18, 2021 (EP) .................................. 21191912

(51) Int. Cl.
*F16K 3/08* (2006.01)
*F16K 31/04* (2006.01)
(Continued)

(52) U.S. Cl.
CPC ............ *F16K 3/085* (2013.01); *F16K 31/041* (2013.01); *F16K 31/055* (2013.01); *F16K 31/535* (2013.01); *F16K 2200/501* (2021.08)

(58) Field of Classification Search
CPC ........ F16K 3/085; F16K 31/53; F16K 27/045; F16K 2200/501; F16K 11/074;
(Continued)

(56) References Cited

U.S. PATENT DOCUMENTS 3,207,181 A * 9/1965 Elizabeth .................. F16K 3/08
251/208
3,426,797 A * 2/1969 Baker ..................... F16K 3/085
251/340
(Continued)

FOREIGN PATENT DOCUMENTS

DE    32 07 895 C2    12/1983
DE    87 15 044 U1    1/1988
(Continued)

OTHER PUBLICATIONS

International Search Report in PCT/EP2022/072455, mailed Nov. 18, 2022.

*Primary Examiner* — Craig J Price
(74) *Attorney, Agent, or Firm* — Collard & Roe, P.C.

(57) ABSTRACT

A valve cartridge has a head piece, through the center of which a spindle passes, by which spindle a valve can be actuated which bears against a shoulder formed by a reduced internal diameter of the head piece, the spindle being sealed via at least one O-ring relative to the head piece. A reducing bushing which is sealed via a first O-ring relative to the head piece is inserted in the head piece, the spindle being sealed via a second O-ring relative to the reducing bushing. Further, a fitting has such a valve cartridge.

13 Claims, 6 Drawing Sheets

(51) Int. Cl.
*F16K 31/05* (2006.01)
*F16K 31/53* (2006.01)

(58) Field of Classification Search
CPC .... F16K 11/076; F16K 31/055; F16K 31/041; F16K 31/043; F16K 31/0668; F16K 31/54; F16K 31/535
USPC ............ 251/366, 208, 304; 137/637.5, 625.5
See application file for complete search history.

(56) References Cited

U.S. PATENT DOCUMENTS

| | | | | |
|---|---|---|---|---|
| 3,958,601 | A * | 5/1976 | Schmitt | F16K 11/0782 137/636.2 |
| 4,596,377 | A * | 6/1986 | Taylor | F16K 31/043 251/294 |
| 4,821,765 | A * | 4/1989 | Qbal | F16K 3/08 251/288 |
| 4,899,982 | A | 2/1990 | Lange | |
| 4,901,977 | A * | 2/1990 | Hendrick | F16K 3/085 74/420 |
| 5,020,568 | A * | 6/1991 | Taylor | F16K 3/08 137/454.6 |
| 5,025,832 | A * | 6/1991 | Taylor | F16K 3/085 251/208 |
| 5,025,833 | A * | 6/1991 | Hendrick | F16K 3/085 251/118 |
| 5,365,978 | A * | 11/1994 | Woods | F16K 3/08 137/454.6 |
| 6,273,132 | B1 * | 8/2001 | Chrysler | F16K 3/085 251/208 |
| 6,431,211 | B1 * | 8/2002 | Wang | F16K 3/08 137/625.31 |
| 7,651,067 | B2 * | 1/2010 | Schwarzer | F16K 3/08 251/337 |
| 7,810,521 | B2 * | 10/2010 | Gloor | F16K 11/074 137/636 |
| 8,281,814 | B2 * | 10/2012 | Kim | F16K 11/0743 137/454.6 |
| 9,103,421 | B2 * | 8/2015 | Lobo | F16K 31/53 |
| 9,404,561 | B2 * | 8/2016 | Lobo | F16K 31/53 |
| 9,476,509 | B2 * | 10/2016 | Tuineag | F16K 3/32 |
| 9,689,520 | B2 * | 6/2017 | Taneya | F16D 48/02 |
| 10,619,899 | B2 * | 4/2020 | Willers | F16K 11/0853 |
| 10,941,870 | B1 * | 3/2021 | Sonnier | F16K 35/00 |
| 11,619,313 | B2 * | 4/2023 | Wendt | F16K 11/078 137/454.5 |
| 11,629,787 | B1 * | 4/2023 | Sonnier | F16K 31/535 137/556 |
| 11,703,144 | B2 * | 7/2023 | Knupfer | F16K 31/0668 137/625.31 |
| 11,867,302 | B2 * | 1/2024 | Molina | F16K 15/182 |
| 12,338,907 | B2 * | 6/2025 | Wendt | F16K 31/535 |
| 2006/0192166 | A1 * | 8/2006 | Lange | F16K 3/08 251/264 |
| 2008/0054210 | A1 * | 3/2008 | Smith | F16K 3/08 251/208 |
| 2009/0205728 | A1 * | 8/2009 | Perez | F16K 3/085 137/625.3 |
| 2017/0370492 | A1 * | 12/2017 | Obrist | F16K 3/34 |
| 2021/0199213 | A1 | 7/2021 | Knupfer et al. | |
| 2022/0316618 | A1 * | 10/2022 | Billet | F16K 31/041 |

FOREIGN PATENT DOCUMENTS

| | | | |
|---|---|---|---|
| DE | 36 38 180 C2 | 8/1988 | |
| EP | 0 343 312 A2 | 11/1989 | |
| WO | WO-2020057736 A1 * | 3/2020 | ......... F16K 31/0668 |
| WO | 2020/170193 A1 | 8/2020 | |

* cited by examiner a) b)

a) b)

a)

b)

c)

a)

b)

a)

b)

c)

d)

a)

b)

c)

d)

a)                              b)

a)                              b)

a)

b)

a)

b)

a)

b)

VALVE CARTRIDGE

CROSS REFERENCE TO RELATED APPLICATIONS

This application is the National Stage of PCT/EP2022/072455 filed on Aug. 10, 2022, which claims priority under 35 U.S.C. § 119 of European Application No. 21191912.1 filed on Aug. 18, 2021, the disclosure of which is incorporated by reference. The international application under PCT article 21 (2) was not published in English.

BACKGROUND OF THE INVENTION

1. Field of the Invention

The invention relates to a valve cartridge having a head piece, through the center of which piece a spindle passes, by means of which spindle a valve can be activated, which valve lies against a shoulder formed by a reduction in the inside diameter of the head piece, wherein the spindle is sealed off by way of at least one O-ring, relative to the head piece.

2. Description of the Related Art

Exit of media from fittings is controlled using upper valve parts or also valve cartridges. For this purpose, the upper valve part is introduced into the housing of a fitting by means of its head piece. The spindle is connected to a lever, by way of which it can be rotated. In the case of known upper valve parts (cf. DE 32 07 895 C2, DE 36 38 180 C2, DE 87 15 044 U1), two disks are provided, in each instance, to control the through-flow. The disks are produced from ceramic material. One of the two disks—control disk—is arranged in the upper valve part so as to rotate, using a driver that stands in connection to the spindle. The other disk—inlet disk—is a fixed valve seat disk, also referred to as a fixed disk. When the control disk rotates, the disks slide on one another.

In the case of valve cartridges of the type being considered here, the head piece has a reduction in diameter on the inside, and thereby a shoulder for contact of the valve is formed. On the basis of the reduction in the inside diameter, the head piece can be set in place only from the top side, which faces the spindle, during assembly of the upper valve part. Such valve cartridges are also referred to as "top loaders." In the case of these valve cartridges, the spindles have a section having an increased outside diameter, in certain regions, which section is provided with a groove for holding an O-ring, to provide a seal relative to the head piece.

It has been shown that in the case of these valve cartridges, in particular if they have larger dimensions, increased resistance to rotation of the spindle occurs, and therefore spindle activation is perceived as being stiff.

SUMMARY OF THE INVENTION

This is where the invention wishes to provide a remedy. The invention is based on the task of making available a valve cartridge of the above type, which has a reduced resistance to rotation. According to the invention, this task is accomplished by means of a valve cartridge having the characteristics of the characterizing part of claim 1.

With the invention, a valve cartridge is made available, which has a reduced resistance to rotation. Because of the fact that a reduction sleeve is introduced into the head piece, which sleeve is sealed off relative to the head piece by way of a first O-ring, wherein the spindle is sealed off relative to the reduction sleeve by way of a second O-ring, the resistance to rotation of the spindle is reduced.

The invention is based on the recognition that the resistance to rotation of the spindle increases proportionally to the O-ring diameter. This can be explained by the fact that the friction resistance of the spindle relative to the O-ring increases with an increasing inside diameter, since a greater circumferential surface must be moved along the O-ring per spindle rotation. Since the spindle lies against the smaller inside diameter of the O-ring, forming a seal, whereas the greater diameter of the O-ring lies against the head piece, forming a seal, the friction resistance between spindle and O-ring is less than between O-ring and head piece. Due to the lower friction resistance, the spindle always rotates relative to the O-ring, which in turn remains fixed in place on the head piece, due to the greater friction resistance relative to it.

Because of the fact that the spindle is sealed off, according to the invention, by way of a first O-ring, relative to the reduction sleeve introduced into the head piece, the spindle section having an increased outside diameter, which is present in the state of the art, is no longer required, and thereby an O-ring having a lesser inside diameter can be used. As a result, the friction surface is reduced, and thereby, in turn, the resistance to rotation of the spindle is reduced.

In a further development of the invention, the reduction sleeve has an annular groove on its outside, which faces the head piece, to hold the first O-ring. As a result, positioning of the first O-ring in the correct position is guaranteed.

In an embodiment of the invention, the reduction sleeve has a sealing surface for contact with the second O-ring on its inner side, which faces the spindle, which surface is arranged offset from the annular groove, preferably on its side of the annular groove that faces the valve. As a result, an offset arrangement of the two O-rings relative to one another is achieved, and thereby the wall thickness of the reduction sleeve and thereby its stability are increased. Alternatively, the sealing surface can also be arranged parallel and opposite to the annular groove.

In a further embodiment of the invention, the sealing surface is formed by a section of the reduction sleeve, the inside diameter of which has been expanded. As a result, the guidance of the second O-ring, which is preferably guided in an annular groove of the spindle, is supported.

In a further development of the invention, the reduction sleeve has a circumferential collar on the end side, with which collar it lies against the head piece. As a result, axial positioning of the reduction sleeve is achieved. Alternatively, a groove for engagement of a groove ring (also referred to as a retaining ring or circlip) can also be introduced into the reduction sleeve, on its outside that faces the head piece.

In an embodiment of the invention, the spindle has an axial through bore for the passage of water. In this regard, the spindle is preferably axially displaceable in the head piece. As a result, a very compact structure of the valve cartridge can be achieved, since the cartridge, in particular, does not have any multiple shoulders for axial fixation of the spindle, and thereby a minimized outside diameter of the head piece is made possible. At the same time, the inside diameter of the passage bore for the water through-flow can be maximized. The axial fixation of the spindle of a valve cartridge structured in this manner can take place during the course of integration into the passage fitting, by means of a stop required for this purpose.

In a further embodiment of the invention, the spindle has a coupling section having a non-round, preferably a polygonal cross-section, outside of the head piece. As a result, coupling with an operating part within a valve fitting is made possible with minimized construction space.

In a further development of the invention, the valve is formed by a control disk and an inlet disk that lies tightly against the first and is held in the head piece in a torque-proof manner. In this regard, it is advantageous if the valve lies against the shoulder, forming a seal, by way of a sealing ring.

In an embodiment of the invention, the spindle has at least one tang on the end side, by way of which tang it is connected to the control disk with shape fit. As a result, a compact, torque-proof connection between spindle and control disk is achieved.

The invention is furthermore based on the task of making available a valve fitting, the spindle of which has a reduced resistance to rotation. According to the invention, this task is accomplished by means of a fitting having the characteristics of claim 12. Because of the fact that a cartridge of the above type is introduced into the fitting, wherein the spindle lies against a stop arranged in the fitting with its free end, whereby it is fixed in place axially, a very compact structure of the fitting housing is achieved. Preferably, an activation part is provided, which is connected to the coupling section with shape fit. In this regard, the activation part can be formed by a lever that can pivot or by an electric motor drive. In a further development of the invention, a water inflow connector and a water outflow connector are provided, which align with one another and between which the valve cartridge is arranged. As a result, a compact construction of the fitting is achieved.

BRIEF DESCRIPTION OF THE DRAWINGS

Other embodiments and further developments of the invention are indicated in the remaining dependent claims. An exemplary embodiment of the invention is shown in the drawing and will be described in detail below. The figures show:

DETAILED DESCRIPTION OF THE PREFERRED EMBODIMENTS

Figure 1:
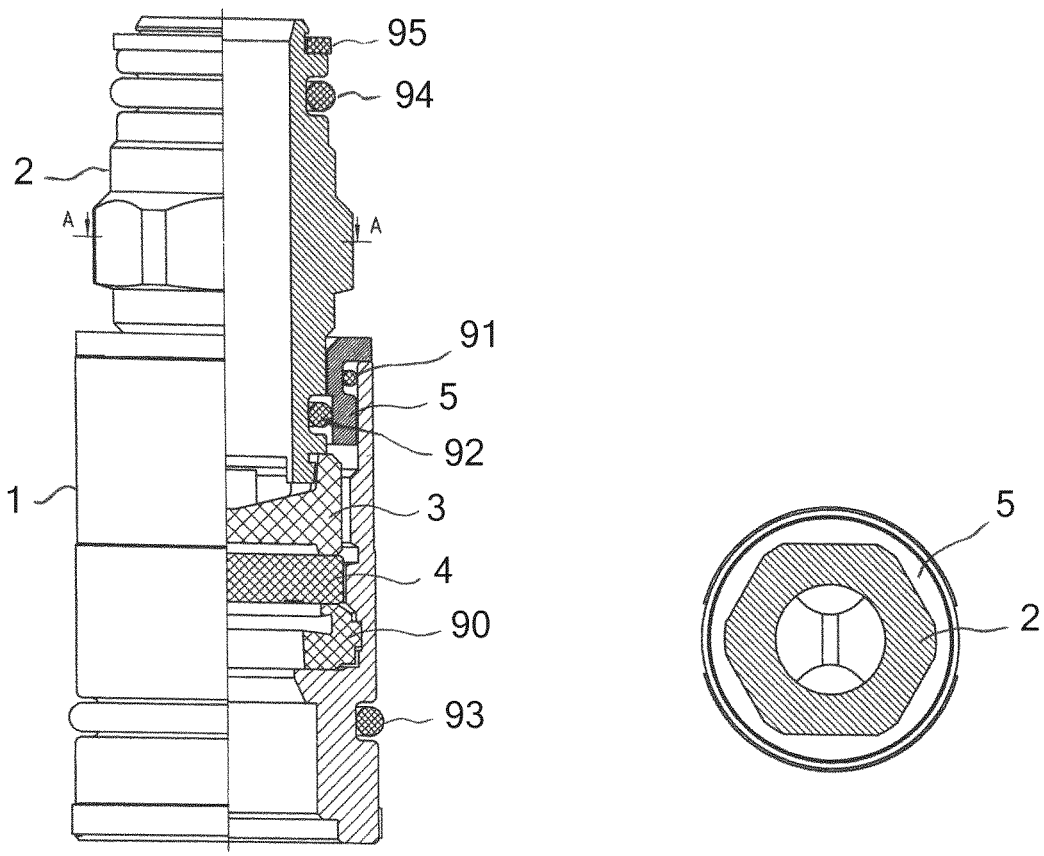
FIG. 1 the schematic representation of a valve cartridge
  a) partly in a front view, partly in an axial section;
  b) in a top view.
Figure 2:
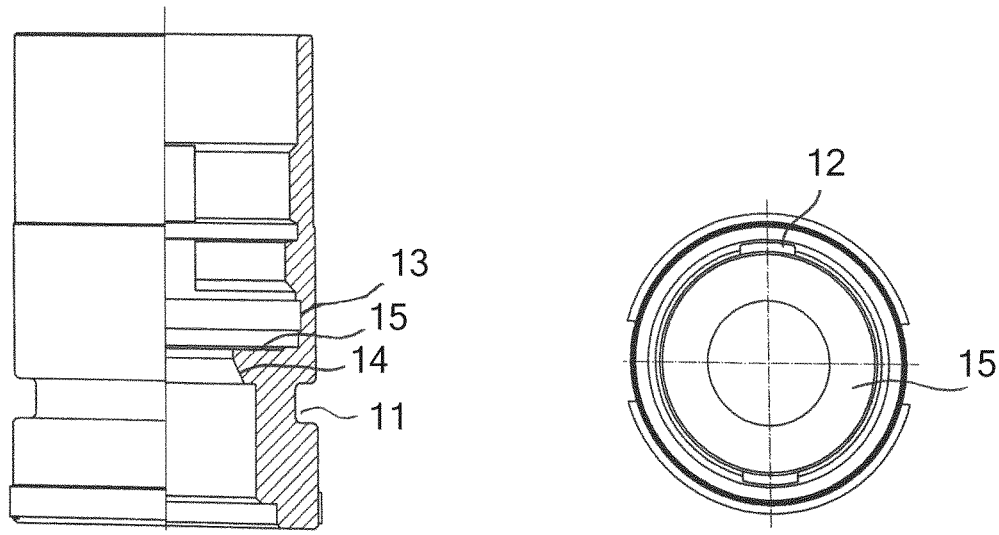
FIG. 2 the representation of the head piece of the valve cartridge from FIG. 1
  a) partly in a front view, partly in an axial section;
  b) in a top view.
Figure 3:
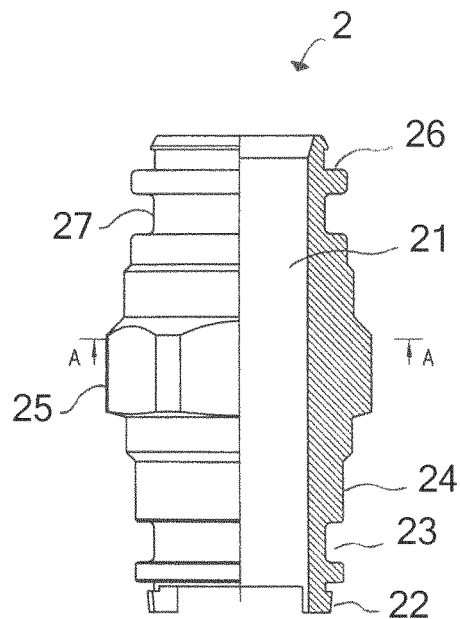
FIG. 3 the representation of the spindle of the valve cartridge from FIG. 1
  a) partly in a front view, partly in an axial section;
  b) in a view from below;
  c) in a sectional representation A-A.
Figure 3:
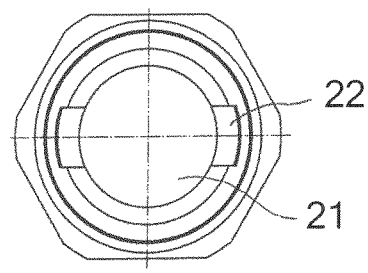
Figure 3:
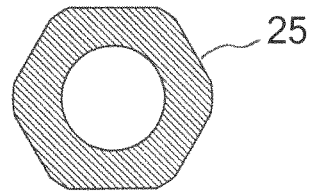
Figure 4:
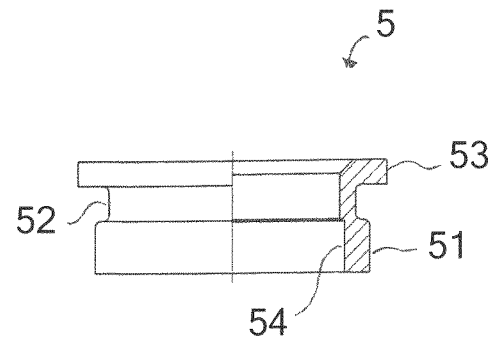
FIG. 4 the representation of the reduction sleeve of the valve cartridge from FIG. 1
  a) partly in a front view, partly in an axial section;
  b) in a view from below.
Figure 4:
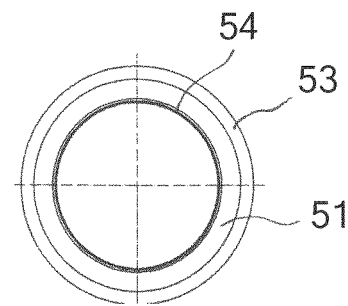
Figure 5:
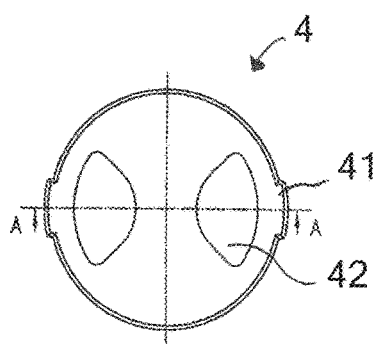
FIG. 5 the representation of the inlet disk of the valve cartridge from FIG. 1
  a) in a top view;
  b) in a view from below;
  c) in a side view;
  d) in section A-A.
Figure 5:
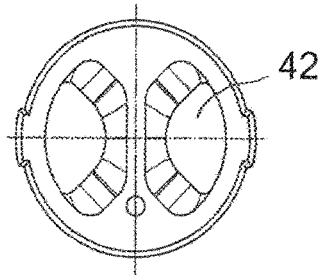
Figure 5:
Figure 5:
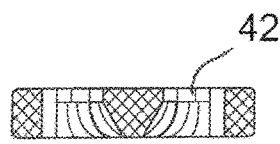
Figure 6:
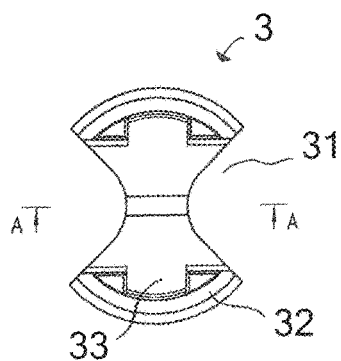
FIG. 6 the representation of the control disk of the valve cartridge from FIG. 1
  a) in a top view;
  b) in a view from below;
  c) in a side view;
  d) in section A-A.
Figure 6:
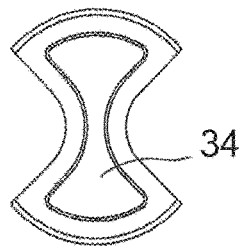
Figure 6:
Figure 6:
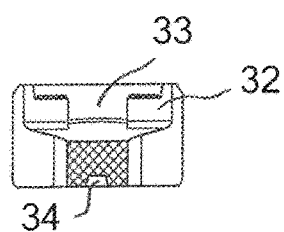
Figure 7:
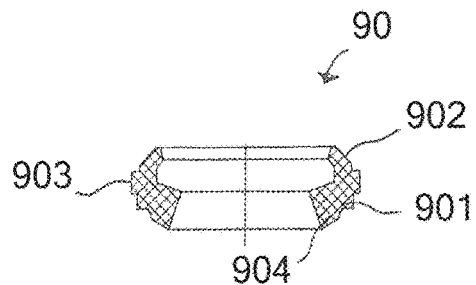
FIG. 7 the representation of the lip seal of the valve cartridge from FIG. 1.

The valve cartridge according to FIG. 1, chosen as an exemplary embodiment, has a head piece 1 through the center of which a spindle 2 passes, guided radially in the piece. A reduction sleeve 5 is set into the head piece 1, which sleeve is sealed off relative to the head piece 1 by way of a first O-ring 91, and in which sleeve the spindle 2 is guided, which spindle is sealed off relative to the reduction sleeve 5 by way of a second O-ring 92.

By way of the spindle 2, a valve can be activated, which makes contact, by way of a lip seal 90, with a shoulder 15 arranged in the head piece 1, which shoulder is formed by a section 14 of the head piece 1 having a reduced inside diameter. In the exemplary embodiment, the valve is formed by a control disk 3 and an inlet disk 4. The control disk 3 is connected to the spindle 2 with shape fit and guided radially in the head piece 1. The inlet disk 4 is arranged in the head piece 1 on the side of the control disk 3 that faces away from the spindle 2, followed by the lip seal 90 that makes contact with the shoulder 15 of the head piece 1. The control disk 3 lies on the inlet disk 4, forming a seal. In the exemplary embodiment, the control disk 3 and the inlet disk 4 are configured as ceramic disks.

In the exemplary embodiment, the head piece 1 is configured as a brass part and consists of a cylindrical hollow body, into the outer mantle surface of which a groove 11 for holding an O-ring 93 is introduced. At the level of the groove 11, the section 14 having a reduced inside diameter is arranged on the inside, with an inside diameter that narrows conically in the direction of the lip seal 90, which section has a ring-shaped surface that forms the shoulder 15. At a distance from the shoulder 15, a groove 13 for holding the lip seal 90 is introduced into the inner mantle surface of the head piece. Furthermore, two axial grooves 12 are arranged on the inside, diametrically opposite one another, which grooves extend from the end of the head piece 1 that faces away from the shoulder 16 all the way to the groove 13. The axial grooves 12 hold the projections 41 of the inlet disk 4, and thereby this disk is held in the head piece 1 in a torque-proof manner.

The spindle 2 is configured as an essentially cylindrical brass lathed part and has an axial through-bore 21 for passage of water in the center. On the end side, two tangs 22 for a shape-fit connection to the control disk 3 are arranged on the spindle, diametrically opposite one another. A sealing groove 23 for holding the second O-ring 92 follows the tangs 22. The spindle 21 is sealed off relative to the reduction sleeve 5 by way of the second O-ring 92. The sealing groove 23 is followed by a cylindrical section 24, by way of which the spindle 2 is guided in the reduction sleeve 5. Approximately in the center, a coupling section 25 is formed circumferentially on the outer mantle surface of the spindle 2, which section is configured in the form of an irregular hexagon. On the end face of the spindle that lies opposite the tangs 22, a circumferential ring ridge 26 is arranged, which holds a sealing disk 95. At a distance from the ring ridge 26, a sealing groove 27 for holding a further O-ring 94 is introduced into the spindle. The spindle 2 is arranged in the head piece 1 so that it can rotate by way of the reduction sleeve 5, but it is axially displaceable.

The control disk 3 has an essentially barrel-shaped configuration, from which two circular cut-outs 31 that lie opposite one another have been removed. In the exemplary embodiment, the circular cut-outs 31 have an angle of approximately 90°. On its side facing the spindle 2, the control disk 3 has a ring-shaped lug 32. The ring-shaped lug 32 comprises the tangs 22 of the spindle 2 in the assembled state. At the foot of the lug 32, recesses 33 are formed, into which a tang 22 engages, in each instance. On its end face that faces away from the spindle 2, a depression 34 is introduced into the control disk 3.

The inlet disk 4 is configured to be essentially cylindrical, and has two projections 41 that lie diametrically opposite one another on the circumference of the disk.

With the projections 41, the inlet disk 4 engages into the axial grooves 12, which are arranged on the inside in the head piece 1 for this purpose, and thereby the inlet disk 4 is held in the head piece 1 in a torque-proof manner. The inlet disk 4 lies on the lip 902 of the lip seal 90 and has sector-shaped passage openings 42. In the exemplary embodiment, two passage openings 42 that lie opposite one another are provided.

In the exemplary embodiment, the lip seal 90 is formed from rubber and comprises a ring piece 901, on which a lip 902 is formed on the end face that faces the inlet disk 4. The lip 902 has an essentially trapezoid configuration in cross-section. The lip 902 is arranged at an angle relative to the horizontal. The outer surface of the lip 902 lies against the inlet disk 4, forming a seal. The ring piece 901 is provided with a flange 903 on the outside, which engages into the groove 13 of the head piece 1. On the inside, a bulge 904 is formed on the ring piece 901. The outside of the bulge 94 lies flat on the shoulder 15 of the section 14 that has a reduced inside diameter.

The reduction sleeve 5 is configured as a brass part that is essentially a hollow cylinder, and has a cylindrical section 51 on its end that faces the control disk 3, which section is followed by an annular groove 52 for holding the first O-ring 91, which groove is delimited, on its sides that lie opposite the cylindrical section 51, by a circumferential collar 53, which projects radially beyond the cylindrical section 51 and with which the reduction sleeve 5 lies on the head piece 1. On the inside, a section 54 having a reduced inside diameter is arranged in the reduction sleeve, in the region of the cylindrical section 51, which section forms the sealing surface for the second O-ring 92, by way of which the spindle 2 is sealed off relative to the reduction sleeve 5.

Figure 8:
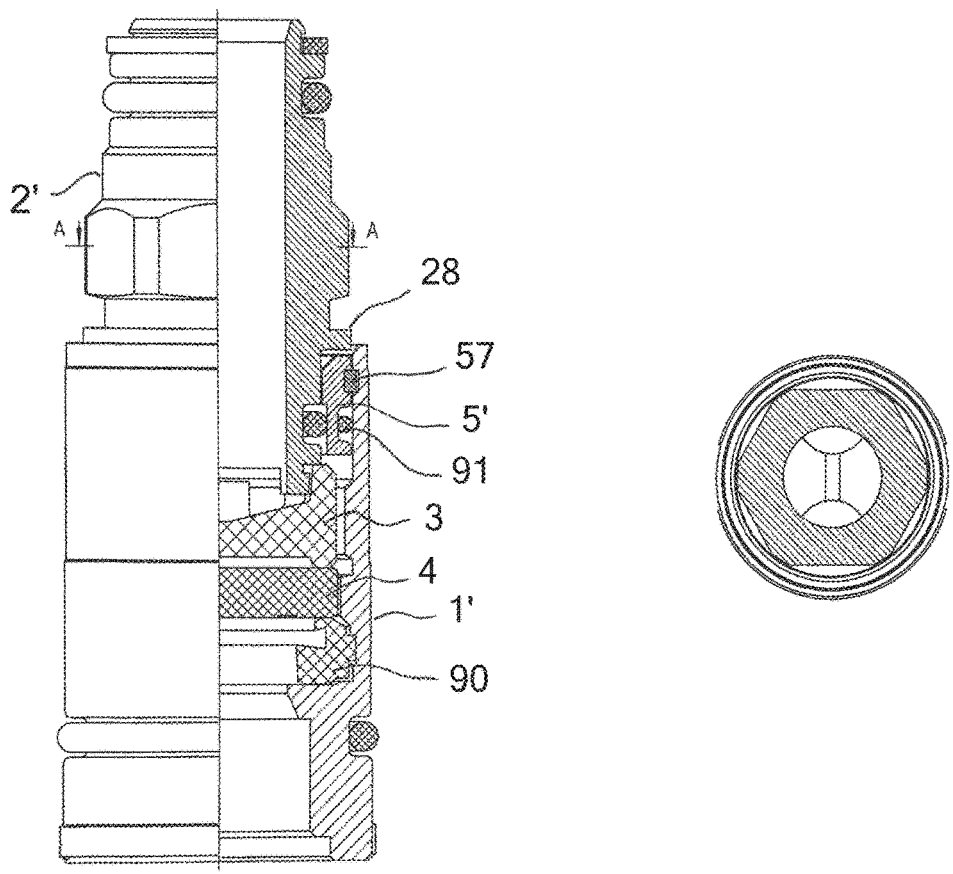
FIG. 8 the schematic representation of a valve cartridge in a further embodiment, partly in a front view, partly in an axial section.
Figure 9:
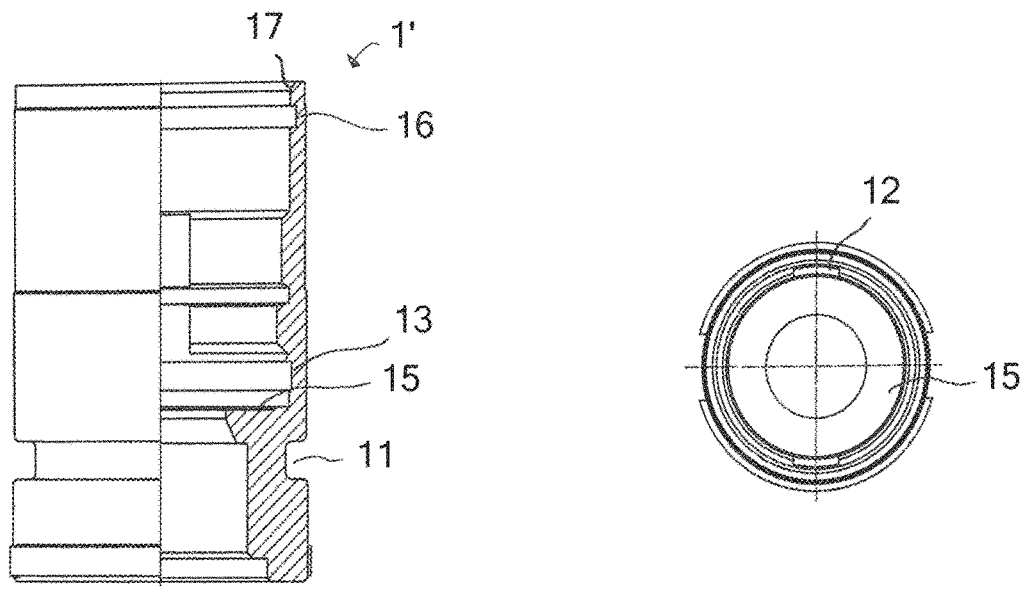
FIG. 9 the representation of the head piece of the valve cartridge from FIG. 8
  a) partly in a front view, partly in an axial section;
  b) in a top view.
Figure 10:
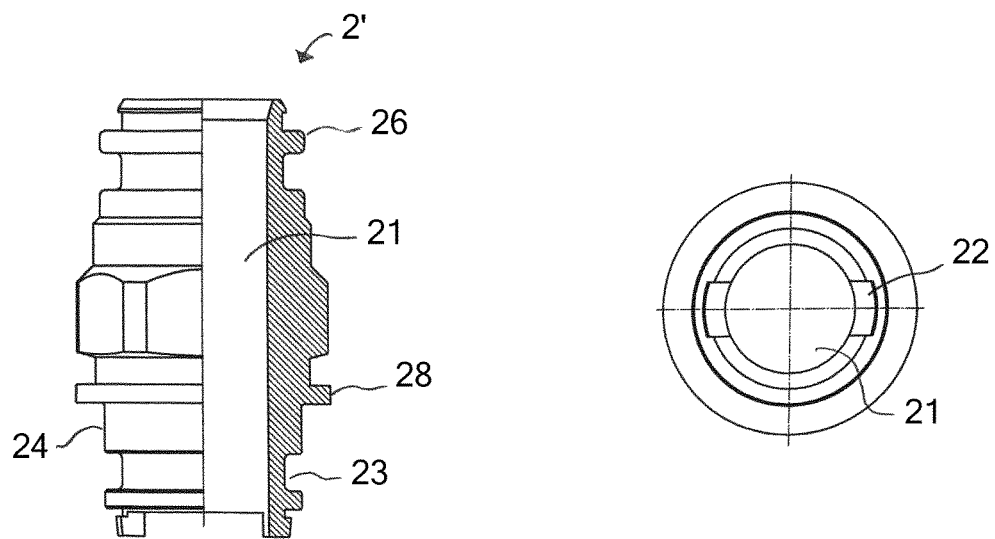
FIG. 10 the representation of the spindle of the valve cartridge from FIG. 8
  a) partly in a front view, partly in an axial section;
  b) in a view from below.
Figure 11:
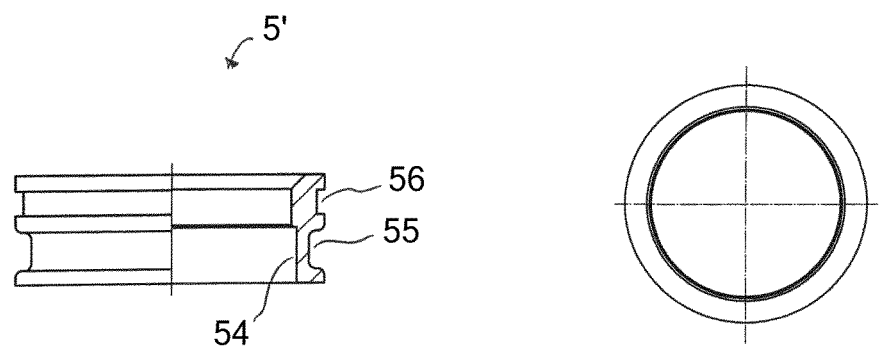
FIG. 11 the representation of the reduction sleeve of the valve cartridge from FIG. 8
  a) partly in a front view, partly in an axial section;
  b) in a view from below.

In FIG. 8, a valve cartridge is shown in a further embodiment. In the case of this valve cartridge, a reduction sleeve 5' having a modified outer contour is provided, which is inserted completely into the head piece 1'. The modified reduction sleeve 5' is shown in FIG. 11. The inside contour of this reduction sleeve 5' is unchanged and has a section 54 having a expanded inside diameter, which section forms a sealing surface for the second O-ring 92, by way of which the spindle 2 is sealed off relative to the reduction sleeve 5'. On the outside, an annular groove 55 for holding the first O-ring 91 is introduced into the reduction sleeve 5', in the region of the section 54 having an expanded inside diameter. This first O-ring 91 is therefore arranged at the same level as the second O-ring 92. A groove 56 for holding a groove ring 57 is introduced at a distance from the annular groove 55, by way of which ring the reduction sleeve 5' is held axially in the head piece 1'. For this purpose, a groove 16 is introduced into the head piece 1', into which groove the groove ring 57 engages. For the remainder, the head piece 1'—aside from a circumferential chamfer 17 introduced on the inside, on the side of the head piece that faces the spindle 2'—is unchanged. In this exemplary embodiment, the spindle 2' is configured to be unchanged, to a great extent. It merely additionally has a circumferential collar 28 on the side of the cylindrical section 24 that faces the coupling section 25, which collar projects into the chamfer 17 of the head piece.

Figure 12:
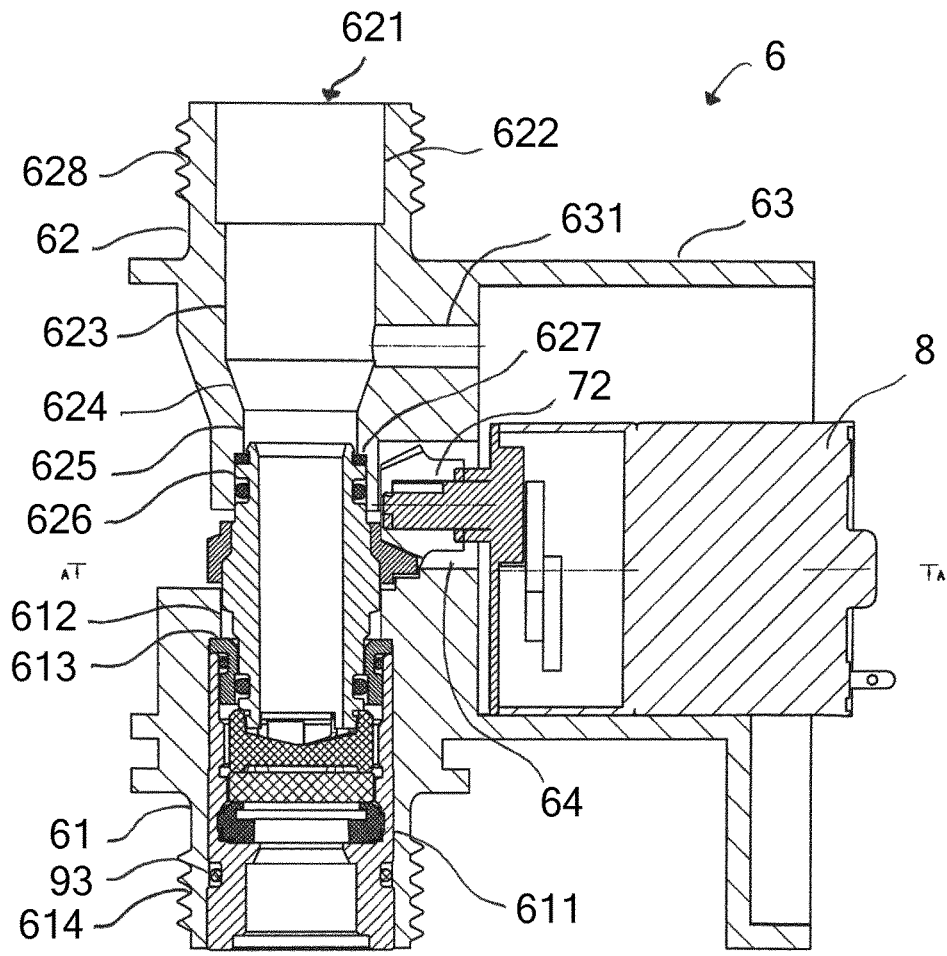
FIG. 12 the schematic representation of a passage valve fitting
  a) in a longitudinal section;
  b) in section A-A.
Figure 12:
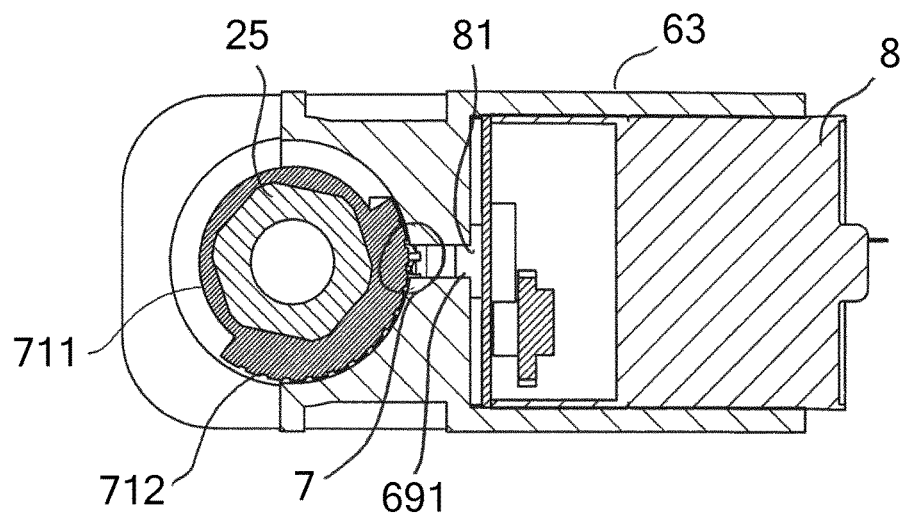

In FIG. 12, a fitting housing 6 is shown, into which a valve cartridge according to the invention, according to FIG. 1, is inserted. The fitting housing 6 comprises a water inflow section 61 and a water outflow section 62, through which a water inflow channel is guided, as well as a drive section 63.

The water inflow section 61 has a cylindrical cartridge holder 611 as part of the water inflow channel, which holder is delimited by means of a section 612 having a reduced inside diameter, by means of which section a stop 613 is formed. On the end side, the water inflow section 61 has an outside thread 614 on the outside, for connecting a water inflow line.

The water outflow section 62 comprises a stepped bore 621, as part of the water inflow channel, which bore has a first cylindrical section 622, followed by a second cylindrical section 623 having a reduced inside diameter, which makes a transition into a conically narrowing section 624, which opens into a third cylindrical section 625, which is followed by a fourth cylindrical section 626 having an expanded inside diameter, by means of which a ring-shaped contact surface 627 is formed. On the end side, the water outflow section 62 has an outside thread 628 on the outside, for connecting a water outflow line.

The drive section 63 is configured to be essentially cylindrical and opens into a gear mechanism space 64 that has a passage 641 that opens out between the water inflow section 61 and the water outflow section 62. Furthermore, a measurement bore 631 is arranged in the drive section 63, which bore opens into the second section 623 of the stepped bore 621.

The valve cartridge is introduced into the cartridge holder 611, wherein the head piece 1 lies against the stop 613 by way of the collar 53 of the reduction sleeve 5. The reduction sleeve 5 is thereby axially fixed in place between the head piece 1 and the stop 613. The head piece 1 is sealed off relative to the cartridge holder 611 by way of the O-ring 93. The spindle 2 of the valve cartridge projects through the section 612 that has a reduced inside diameter. A bevel 71 of a bevel gear 7 is applied to the coupling section 25; in the exemplary embodiment, this bevel is formed by a ring part 711 in the form of a hollow cylinder, on which part a bevel segment 712 is arranged on the outside.

The bevel segment 712 spans an angle of 110° of the ring part 711. Depending on the maximal desired angle of rotation of the spindle 2, the bevel segment 712 can also span a lesser or a greater angle of the ring part 711. The ring part 711 has an inside contour of an irregular hexagon, which corresponds to the outside contour of the coupling section 25, on which it is arranged. The bevel 71 is thereby connected with the spindle with such shape fit, wherein the bevel 71 projects into the passage 641 with its bevel segment 712.

On the head side, the spindle lies against the contact surface 627 of the water outflow section 62, relative to which it is sealed off by way of the sealing disk 95. Radially, the spindle is sealed off relative to the fourth cylindrical section 626 of the stepped bore 621 by way of the O-ring 94 that is arranged in the sealing groove 27.

An electric motor 8 is arranged in the drive section 63, the drive shaft 81 of which motor projects into the gear space 64. A bevel gear pinion 72 is applied to the drive shaft 81, which pinion is in engagement with the bevel segment 712 of the bevel 71. To regulate the stream of water that flows through the water outflow section 62, a control and regulation device—not shown—is provided, which is connected to a sensor introduced into the measurement bore 631, preferably a flow and/or temperature sensor, and by way of which the electric motor 8 can be controlled.

The invention claimed is:

1. A valve cartridge having a head piece, and a spindle passing thorough a center of the head piece, by means of which a valve can be activated,
    wherein the valve lies against a shoulder formed by a reduction in an inside diameter of the head piece,
    wherein the spindle is sealed off by at least one O-ring, relative to the head piece,
    wherein a reduction sleeve is introduced into the head piece,
    wherein the reduction sleeve is sealed off relative to the head piece by a first O-ring,
    wherein the spindle is sealed off relative to the reduction sleeve by a second O-ring, and
    wherein the spindle has an axial through bore for passage of water.

2. The valve cartridge according to claim 1, wherein the reduction sleeve has an annular groove on its outside, which faces the head piece, to hold the first O-ring.

3. The valve cartridge according to claim 2, wherein the reduction sleeve has a sealing surface for contact with the second O-ring on its inner side, which faces the spindle, wherein the sealing surface is arranged parallel opposite to or axially offset from the annular groove.

4. The valve cartridge according to claim 3, wherein the sealing surface is formed by means of a section of the reduction sleeve that has an expanded inside diameter.

5. The valve cartridge according to claim 1, wherein the reduction sleeve has a circumferential collar on an end side, wherein via the circumferential collar, the reduction sleeve lies against the head piece, or wherein a groove for engagement of a groove ring is introduced into an outer mantle surface.

6. The valve cartridge according to claim 1, wherein the spindle is axially displaceable in the head piece.

7. A fitting having a water through-flow channel into which the valve cartridge according to claim 6 is introduced, wherein a circumferential collar of the reduction sleeve lies against a stop formed by a section of a fitting housing of the fitting having a reduced inside diameter.

8. The fitting according to claim 7, wherein an activation part is provided, which is connected to the coupling section, which is structured to be non-round, with shape fit, wherein the activation part comprises a lever that can pivot or a motor drive.

9. The fitting according to claim 7, further comprising a water inflow connector and a water outflow connector which align with one another, wherein the valve cartridge is arranged between the water inflow connector and the water outflow connector.

10. The valve cartridge according to claim 1, wherein the spindle has a coupling section having a non-round cross-section, outside of the head piece.

11. The valve cartridge according to claim 1, wherein the valve comprises a control disk and an inlet disk that lies tightly against the first O-ring and is held in the head piece in a torque-proof manner.

12. The valve cartridge according to claim 1, wherein the valve lies against the shoulder, forming a seal, by way of a sealing ring.

13. The valve cartridge according to claim 11, wherein the spindle has a tang on an end side, wherein the spindle is connected to the control disk with shape fit by the tang.

* * * * *